April 8, 1924.  
J. A. ERIKSON  
DOUGH RAISER  
Filed Feb. 15, 1923

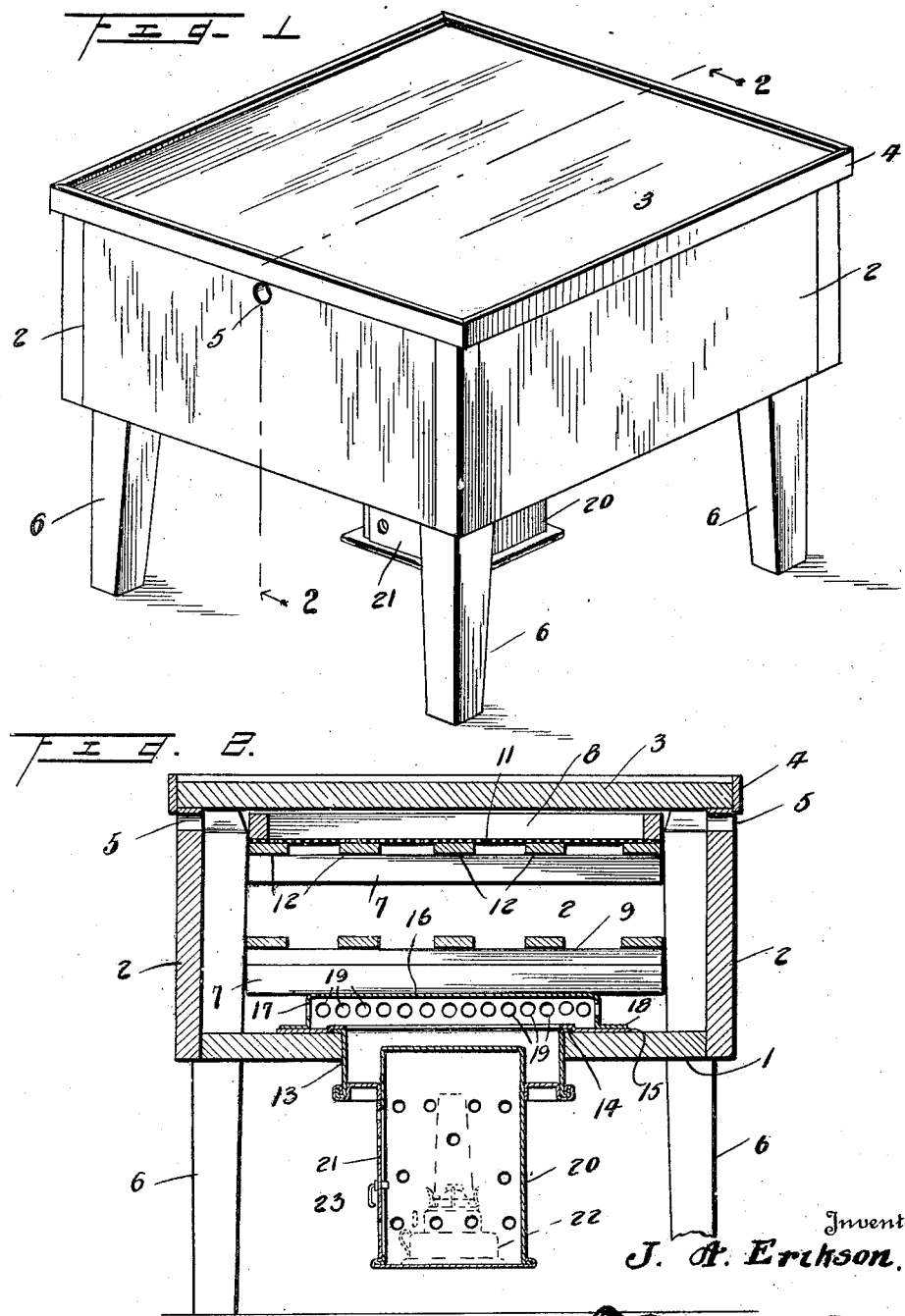

Inventor  
J. A. Erikson.  
By Randolph Jr.  
Attorney

Patented Apr. 8, 1924.

1,490,061

UNITED STATES PATENT OFFICE.

JOHN A. ERIKSON, OF HARLOWTON, MONTANA.

DOUGH RAISER.

Application filed February 15, 1923. Serial No. 619,222.

*To all whom it may concern:*

Be it known that I, JOHN A. ERIKSON, a subject of the King of Sweden, residing at Harlowton, in the county of Wheatland and State of Montana, have invented certain new and useful Improvements in Dough Raisers; and I do hereby declare the following to be a full, clear, and exact description of the invention, such as will enable others skilled in the art to which it appertains to make and use the same.

The primary object of this invention is the provision of a device to insure the fermentation of dough or rising in the initial steps of bread making, said device also serving to facilitate the rising of the bread after being molded or shaped and placed in pans for baking. The device is also adapted for use as a desiccator in the drying and curing of fruit and has a storage chamber for the conservation of food.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application,

Figure 1 is a perspective view of a device embodying the invention,

Figure 2 is a vertical central section thereof, on the line 2—2,

Corresponding and like parts are referred to in the following description and designated in the several views of the drawings by like reference characters.

Figure 3:
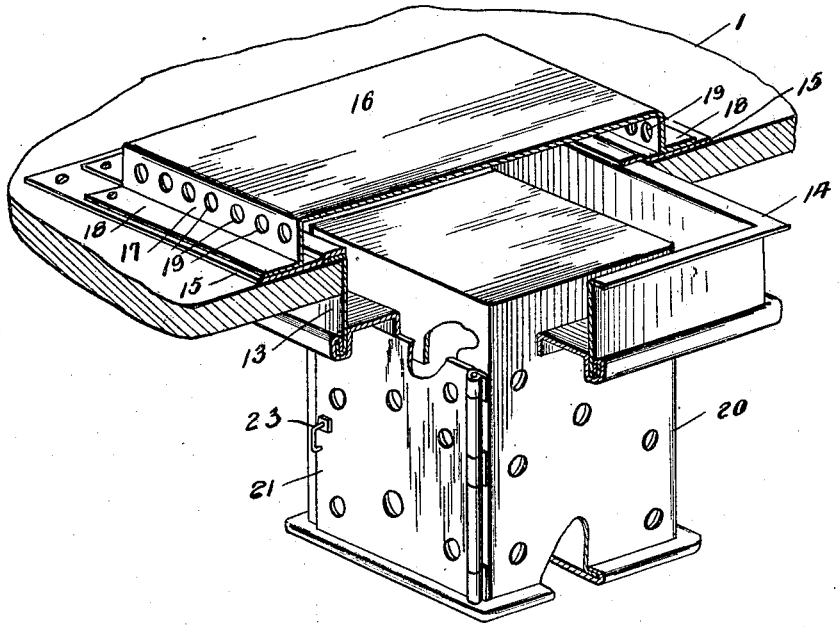
Figure 3 is an enlarged detail perspective view of the bottom showing more clearly the heater, parts being broken away.
Figure 4:
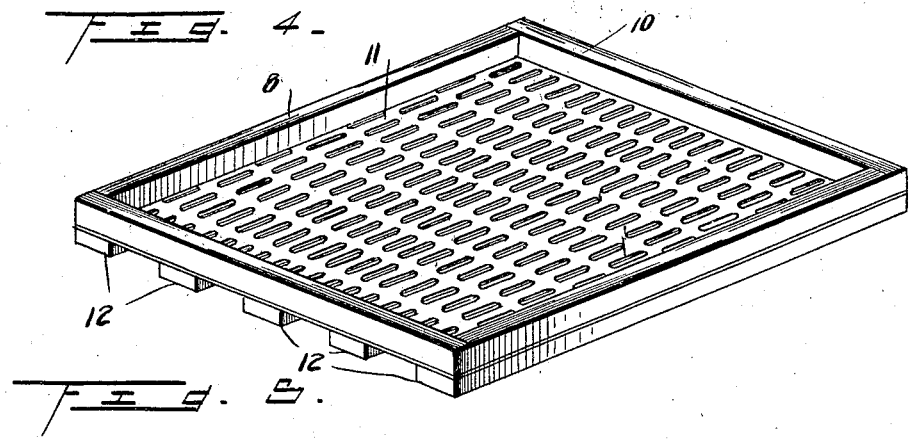
Figure 4 is a detail view of the tray embodying a perforated metal bottom.
Figure 5:
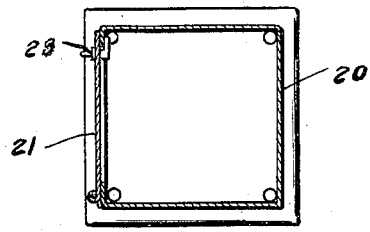
Figure 5 is a detail view of the heater.

The device comprises a cabinet embodying a bottom 1, enclosing sides 2 and a cover 3, the latter being detachable and reversible, whereby it may be used as a kneading board in bread making. The cover 3 includes a rim 4 which projects a short distance beyond the opposite sides of the cover to engage the sides of the cabinet and prevent displacement of the cover in either adjusted position when fitted to the top of the cabinet. Openings 5 are formed near the upper edges of the enclosing sides 2, whereby to provide for proper ventilation. The cabinet is provided with legs 6 which pass through openings formed in the corners of the bottom 1 and obtain a snug fit within the corners of the cabinet and which are secured to the inner faces of the sides 2 adjacent the corners. Strips 7 are attached to the inner faces of opposite sides 2 and constitute rests for top and bottom shelves 8 and 9, respectively.

The top shelf 8 has the form of a tray and embodies a rim 10, a perforated sheet metal bottom 11 and slats 12, the latter reinforcing the bottom 11. The shelf 8, by reason of its tray formation, is adapted to receive fruit or other article to be dried or cured. The shelf 8 may be placed with either side uppermost according to its particular use, but when adapted for use as a tray it is arranged with the rim 10 facing upward to prevent displacement of the article placed upon the bottom 11. The bottom shelf 9 is of the formation of a grid and comprises opposite cleats and connecting slats.

An opening is formed centrally of the bottom 1 and receives a metal box 13 which is supported in the opening by means of an outer flange 14 engaging the top side of the bottom 1 adjacent the opening. A plate 15 is secured to the bottom 1 and overlaps the outer flange 14 of the box 13, the center portion of the plate 15 being cut away in line with the box 13. A cover 16 extends over the plate 15 and comprises a depending rim 17 and an outer flange 18. Openings 19 are formed in the rim 17 and provide for a circulation of air. The cover 16 operates to equalize the temperature within the cabinet.

A casing 20, preferably of sheet metal and closed at its top, bottom and sides, is supported in an opening formed in the bottom of the box 13 and its upper portion extends above the bottom of the box 13 a short distance. The casing 20 is provided in its front with an opening which is closed by means of a door 21, the latter admitting of ready access to the casing for the placing of a lamp 22 therein or the removal of the lamp therefrom when it is required to trim the same.

In practice, the vessel containing the rising or dough to be set for fermenting is placed within the cabinet and if necessary both shelves 8 and 9 may be removed. The lamp 22 is lighted and the wick turned up or down, according to the heat required, the top of the cabinet being closed by placing the cover 3 in position thereon. It will thus be understood that the rising or dough is protected from drafts and chill and may be kept at any required temperature to insure fermentation. After the dough has been shaped into loaves and placed in pans, the latter are arranged within the cabinet upon the shelves 8 and 9 to raise preliminary to baking. The construction of the device is such that while particularly designed for raising bread, it may be used for desiccating or drying fruit or the like, or may be used as storage space for food. The cover 3 may be used as a kneading or pastry board, and for this purpose it is detachable and adapted to be reversed. It is also observed that the device may be used as a table or seat, as required.

The casing 20 containing the lamp, such as generally used in incubators, is provided in its bottom and sides with openings to insure a proper supply of air to the lamp and as means for opening and closing the door 21 and fastening the same when closed, a catch 23 is provided and may be of any approved construction. It should be stated that it is proposed to use a thermometer in determining the temperature and the same may be placed within the cabinet in any convenient position and the lamp may be turned up or down as desired to obtain the required temperature, as indicated by the thermometer.

What is claimed is:

1. A device of the character specified comprising a cabinet, a temperature-equalizing means within the cabinet having a relatively large substantially imperforate wall disposed within the dough-raising chamber and arranged in the line of heating, said wall being spaced from the inner surface of the cabinet, and said member having lateral heat discharge openings between said wall and said surface.

2. A device of the character specified comprising a cabinet having an opening in its bottom, a box fitted in said opening, a heater casing fitted in an opening formed in the bottom of the box and extending upwardly into and above the base of the latter, and a temperature equalizing cover interiorly of the casing extending over said box and having a depending rim in which are formed a plurality of heat-escape openings.

3. A device of the character specified comprising a cabinet having an opening in its bottom, a box fitted in said opening and having a flange supported by the cabinet, a heater casing fitted in an opening formed in the bottom of the box and extending upwardly into and above the base of the latter, a plate interiorly of and secured to the bottom of the cabinet and overlapped by said flange, said plate having its central portion cut away opposite the box, and a cover extending over the box and plate, a relatively large substantially imperforate top wall and having a depending rim in which a plurality of openings are formed, and an outer flange at the lower edge of the rim to engage the said plate.

In testimony whereof I affix my signature in presence of two witnesses.

JOHN A. ERIKSON.

Witnesses:
HENRY M. JORDET,
J. W. BREEN.